United States Patent [19]

Terasaka et al.

[11] Patent Number: 4,549,079
[45] Date of Patent: Oct. 22, 1985

[54] APPARATUS FOR MEASURING THICKNESS OF PAINT COATING

[75] Inventors: Yoshiyasu Terasaka, Ibaraki; Masao Tanabe, Osaka; Masanori Hori, Ibaraki, all of Japan

[73] Assignee: Chugai Ro Kogyo Co., Ltd., Japan

[21] Appl. No.: 453,935

[22] Filed: Dec. 28, 1982

[30] Foreign Application Priority Data

Dec. 29, 1981 [JP] Japan ................................ 56-212029

[51] Int. Cl.[4] ............................................... G01J 1/00
[52] U.S. Cl. .................................... 250/339; 250/358.1
[58] Field of Search ................... 250/338 R, 339, 341, 250/349, 358.1, 359.1

[56] References Cited

U.S. PATENT DOCUMENTS 3,433,052  3/1969  Maley .................................. 250/339
3,973,122  8/1976  Goldberg ............................ 250/341
3,994,586  11/1976  Sharkins et al. .................... 250/341

Primary Examiner—Janice A. Howell
Attorney, Agent, or Firm—Jackson & Jones

[57] ABSTRACT

The present disclosure relates to an apparatus for measuring the thickness of a paint coating on a substrate. The apparatus includes at least one band-pass filter for admitting a predetermined wave range of infrared rays, including both the infrared rays reflected at the surface of the substrate and passed through the paint coating and the infrared rays radiated due to the temperature both of the paint coating and the substrate; two infrared ray sensors, one of which detects the infrared rays passed through the filter and including both of the reflected rays and the rays radiated due to the temperature, and the other of which detects only the rays radiated due to the temperature; and a processing unit in which the signals supplied from both infrared ray detectors are compared with each other and the difference representing only the reflected infrared rays are processed on the bases of reference coefficients relating to the reflection of the infrared rays at the reflection of the substrate and the absorption of the infrared rays by the paint coating to produce signals representing thickness of the paint coating.

12 Claims, 2 Drawing Figures

APPARATUS FOR MEASURING THICKNESS OF PAINT COATING

BACKGROUND OF THE INVENTION

The present invention generally relates to an apparatus for measuring the thickness of a paint coating on a substrate such as a metallic sheet or the like, and more particularly to an apparatus for continuously measuring the thickness of a paint coating by using infrared rays.

Conventionally, color painted metallic sheets and the like have been widely employed in various industrial fields for producing products such as building materials, appliances, food cans, etc. In the case of painting on such metallic sheets, it is important to achieve a desired precise thickness of the paint coating, so that a measuring apparatus with high accuracy has been required for this purpose.

Up to the present, there have been provided measuring apparatuses utilizing radiation, for example, of X rays or $\beta$ rays. However, these apparatuses have such disadvantages that owing to the strict legal requirements imposed on them, they cannot be readily operated or utilized by unqualified persons, while the measuring accuracy obtainable thereby is not necessarily so high, and therefore, these measuring apparatuses have been extremely limited in their applications.

Recently, there has been provided a measuring apparatus utilizing infrared rays instead of X rays and $\beta$ rays, for example in the U.S. Pat. No. 3,973,122. This type of measuring apparatus utilizes the characteristic properties such that some part of the infrared rays including a specific wave length can be absorbed by the paint coating comprising high polymer when the rays pass through the paint coating.

The measuring apparatus shown in said U.S. patent comprises a black-body radiator for emitting beams of infrared rays of a predetermined wave length to a film laminated on a substrate, and an electronic pyrometer for receiving the beams of the infrared rays reflected from the surface of the substrate and measuring the thickness of the paint coating on the basis of the intensity of the reflected infrared rays, some part of which has been absorbed by the paint coating in the passage therethrough.

However, the conventional measuring apparatus as described above still has a disadvantage in that a high measuring accuracy cannot be constantly obtained with respect to various kinds of paint coatings.

SUMMARY OF THE INVENTION

It is, therefore, an essential object of the present invention to provide an apparatus for measuring the thickness of a paint coating by utilizing infrared rays, which can measure thicknesses of various kinds of paint coatings with high accuracy.

A further object of the present invention is to provide a measuring apparatus of the type as described above, which measures the thickness of a paint coating with high accuracy by eliminating the influence on the infrared rays radiated due to temperatures of both of the paint coating and substrate per se.

In accomplishing these and other objects, according to the present invention, there is provided, an apparatus for measuring thicknesses of paint coatings formed on a substrate such as a metallic sheet, which comprises a black-body radiator for continuously emitting constant infrared rays towards the paint coating on the substrate to be continuously conveyed in one direction; at least one band-pass filter for admitting infrared rays having predetermined wave length range to pass therethrough, the infrared rays including a ray emitted from the black-body radiator and reflected at a surface of the substrate through the paint coating and a rays radiated due to temperatures of both of the paint coating and the substrate: infrared ray detecting sensors, one of which detects intensity of said reflected infrared rays from the substrate to convert the reflected infrared rays into corresponding electric signals, while the other of which detects intensity of the infrared rays radiated due to temperatures of both of the paint coating and the substrate to convert the infrared rays into corresponding electric signals; a reference signal source in which various premeasured reference coefficients of infrared ray absorption with respect to various thicknesses of the paint coating and various premeasured reference reflection coefficients with respect to various kinds of reflection surface of different substrates are memorized and signals representing these reference coefficients are produced and; a processing unit in which the signals from both of the infrared ray detecting sensors are compared with each other, and signals representing only the intensity of the reflected infrared ray from the substrate are produced as signals representing the thickness of the paint coating after being processed on the basis of said reference coefficients supplied from said reference signal source. Therefore, according to the present invention, the thicknesses of various kinds of paint coatings can be measured with high accuracy. And further, since the signals produced in the processing unit represents only infrared radiation reflected at the surface of the substrate without the influence of the infrared rays radiated due to a temperature of both of the paint coating and the substrate per se, the signals can represent the thickness of the paint coating with a high accuracy.

BRIEF DESCRIPTION OF THE DRAWINGS

These and other objects and features of the present invention will become apparent from the following description taken in conjunction with a preferred embodiment thereof with reference to the accompanying drawings, in which.

Before the description of the present invention proceeds, it is to be noted that like parts are designated by like reference numerals throughout the views of the accompanying drawings.

DETAILED DESCRIPTION OF THE INVENTION

Figure 1:
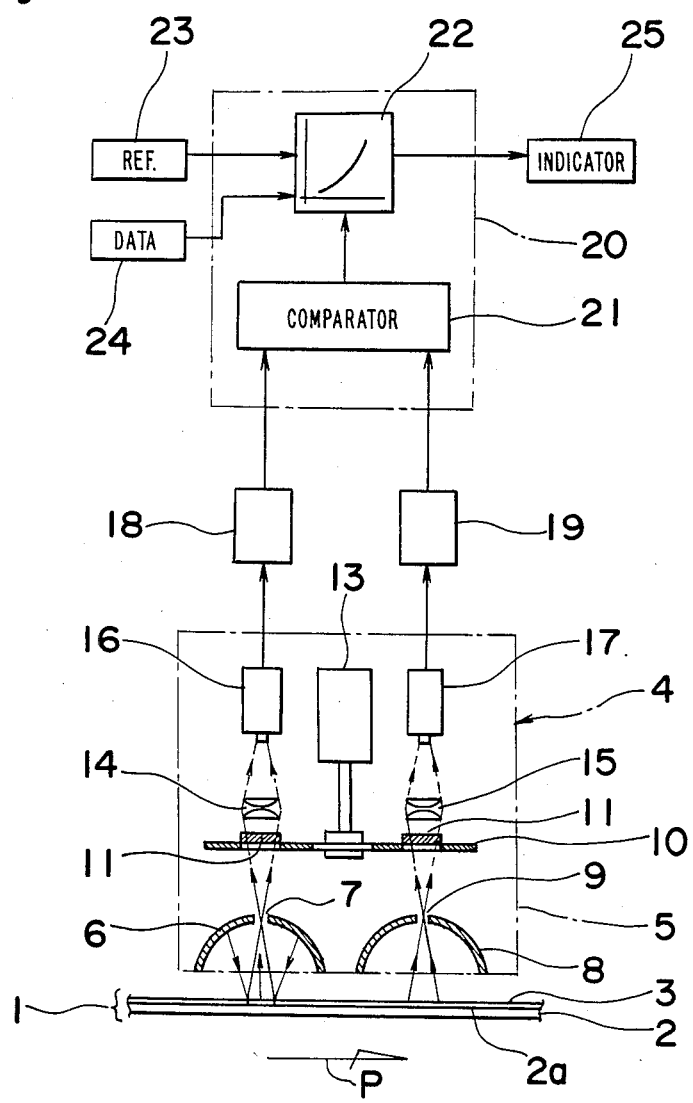
FIG. 1 is a diagrammatic view of a measuring apparatus according to one preferred embodiment of the present invention.
Figure 2:
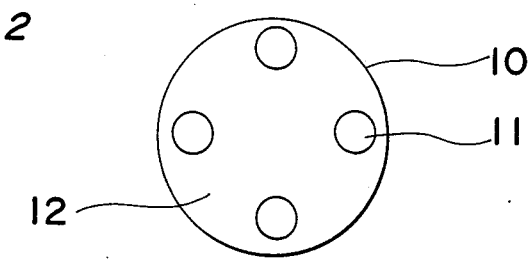
FIG. 2 is a top plan view of a rotation disc employed in the apparatus of FIG. 1.

Referring to FIG. 1, there is shown a measuring apparatus according to the present invention. There is indicated a color sheet 1 comprising a substrate 2 and a paint coating 3 laminated on the substrate 2. The sheet 1 is conveyed in a direction indicated by an arrow P by a conveyance means (not shown).

The measuring apparatus generally includes an infrared ray detecting means 4 which is arranged along the passage of the sheet 1 so as to face the paint coating 3 of the sheet 1 to be conveyed. The infrared ray detecting means 4 comprises its housing 5, a black-body radiator 6 for emitting the beams of the infrared rays to the sheet 1 and a cavity 8 arranged next to the black-body radiator 6 at the forward position in the proceeding direction of the sheet 1.

The black-body radiator 6 has substantially the same construction as that of the black-body radiator 6 shown in said U.S. Pat. No. 3,973,122 described earlier. In other words, the black-body radiator 6 has a hemispherical cavity having at its top portion, a hole 7, and is arranged to be electrically heated to a constant temperature under control of a thermostatic regulator (not shown) to produce to the sheet 1 infrared rays which have a wave range including wave lengths which are able to be strongly absorbed by the paint coating 3 on the substrate 2 in the passage therethrough.

The infrared rays emitted from the inner surface of the black-body radiator 6 enter the layer of the paint coating 3 and are reflected at the top surface 2a of the substrate 2 and subsequently pass through the layer of the paint coating 2 to the hole 7 of the cavity. The infrared rays passing though the hole 7 are not only the reflected infrared rays but also infrared rays radiated due to the temperature of the sheet 1 per se.

An isolation chamber 8 has a cavity of the same shape as the radiator 6 and has a hole 9 which admits the infrared rays radiated due to the temperature of the sheet 1 to pass therethrough.

The infrared ray detecting means 4 further includes a rotation disc 10 having a plurality of band-pass filters 11 which admit the infrared rays from the holes 7 and 9 of the cavities 6 and 8 to pass therethrough, light collecting lens 14 and 15 which respectively collect the infrared rays from respective portions of the rotation disc 11 and transfer them to the respective infrared ray sensors 16 and 17.

The rotation disc 10 is so arranged as to rotate at a predetermined constant speed by aid of an electric motor 13. The band-pass filters 11 are concentrically arranged on the disc body 12 so as to receive the infrared rays from the substrate 1. Each filter 11 allows a predetermined wave range of wave lengths such as 1 to 3 $\mu$m or 3 to 6 $\mu$m to pass therethrough.

The infrared ray sensors 16 and 17 respectively detect the infrared rays passed through the filters 11, and infrared rays radiated from the disc body 12 per se which are radiated due to the temperature thereof generated by the heat from the black-body radiator 6. The infrared ray sensors 16 and 17 respectively convert the infrared rays supplied thereto into electric signals corresponding to the amount of the infrared rays and respectively supply the signals into signal processing curcuits 18 and 19 in time divided manner. In each of the signal processing circuits 18 and 19, the signals corresponding to the infrared rays passed through the filters 11 and the signals corresponding to the infrared rays radiated from the disc body 12 are compared with each other, and subsequently signals representing a difference between both of the infrared ray signals are produced and supplied into a comparator 21 included in a processing unit 20. In other words, the signals produced in the signal processing circuit 18 represent the total amount of both of the reflected infrared rays from sheet 2 and the infrared rays radiated due to the temperature of the sheet 2 per se, not including the infrared rays radiated due to the temperature of the black-body radiator 6 per se. While the signals produced from the signal processing circuit 19 represent only the amount of the infrared rays radiated due to the temperature of the sheet 1, not including the infrared rays radiated due to the temperature of the black-body radiator 6.

The processing unit 20 includes said comparator 21 and a function conversion circuit 22. In the comparator 21, the signals from the signal processing circuits 18 and 19 are compared with each other, and signals representing the difference between the signals from both of the signal processing circuits 18 and 19 are converted into signals representing absorbance relating to the paint coating 2 of the sheet 1 and supplied into the function conversion circuit 22. The difference indicates only the amount of the infrared rays passed through the layer of the paint coating 3, not including the infrared rays radiated due to the temperature of the sheet 1.

There is provided a reference signal source 23 in which reference data, namely various reference coefficients of infrared ray absorption by the various thickness of paint coatings 2 and various reference reflection coefficients with respect to the top surface 2a of the different sheets 2 may be memorized. Reference signals representing said coefficients of infrared ray absorption and the reflection coefficients are supplied from the reference signal source 23 to the function conversion circuit 22. There is also provided a correction data input circuit 24 to which correction data relating to the treating condition to the metallic sheet in the former step may be continuously or periodically supplied. The reflection coefficients of the top surface 2a of the sheet 2 depends on the treating condition such as roughness of the top surface of the substrate 2 and thickness of the conversion coating on the top surface 2a of the sheet 2. The electric correction signals corresponding to the treating condition can be produced and supplied to the function conversion circuit 22 so that the reference signals supplied to the function conversion circuit 22 from the reference signal source 23 may be corrected by the correction signals from the correction data input circuit 24.

In the function conversion circuit 22, the signals supplied from the comparator 21 are processed on the basis of a formula for function conversion by using the reference information, namely the signals representing the reference coefficients of infrared ray absorption by the paint coating 3 and the reference reflection in coefficients of the top surface 2a of the substrate 2, and signals representing the thickness of the paint coating 2 are produced and supplied into an indicator 25 in which the thickness of the paint coating 2 may be indicated. The signals representing the thickness of the paint coating 2 may be used for controlling a paint coating apparatus (not shown) so as to adjust the amount of the paint to be coated.

Although the present invention has been fully described by way of example with reference to the accompanying drawing, it is to be noted here that various changes and modifications will be apparent to those skilled in the art. For example, the cavity 8 may be disposed at a position prior to the black-body radiator 6 in the proceeding direction of the substrate 1, since the heat up due to the infrared rays from the black-body radiator 6 is extremely small. Further, the signals representing the amount of the infrared rays from the disc body 12 may be supplied into other circuit than the infrared ray sensors 16 and 17, for example, into the correction data input circuit 24. Still further, the filters 11 may be arranged at fixed positions other than the disc body 12 by using a rotation disc body having holes which admit the infrared rays from the black-body radiator 6 to pass therethrough to the filters 11. Still further, the rotation disc 10 may be so arranged as to have only one band-pass filter. Therefore, unless otherwise such changes and modifications depart from the scope of the present invention, they should be construed as included therein.

What is claimed is:

1. Apparatus for measuring thickness of a paint coating formed on a substrate, which comprises a black-body radiator for continuously emitting constant infrared rays to the paint coating on the substrate to be continuously conveyed in one direction; at least one band-pass filter for admitting infrared rays having predetermined wave length range to pass therethrough, said infrared rays including infrared rays emitted from the black-body radiator and reflected at a surface of the substrate through said paint coating and infrared rays radiated due to temperature of both of the paint coating and the substrate; infrared rays detecting sensors, one of which detects intensity of said reflected infrared rays from the substrate to convert the reflected infrared rays to corresponding electric signals, and the other of which detects intensity of the infrared rays radiated due to temperature of both of the paint coating and the substrate to convert the infrared rays to corresponding electric signals; a reference signal source in which various premeasured reference coefficients of infrared ray absorption with respect to various thicknesses of the paint coating and various premeasured reference reflection coefficients with respect to various kinds of reflection surfaces of different substrates are memorized and signals representing these reference coefficients are produced and a processing unit in which the signals from said infrared radiation detecting sensors are compared with each other, and signals representing only the intensity of the reflected infrared rays from the substrate are produced as signals representing the thickness of the paint coating after being processed on the basis of said reference coefficients supplied from said reference signal source.

2. Apparatus as claimed in claim 1, wherein said black-body radiator has a hemispherical cavity having an inner surface from which the infrared rays are emitted and which has at its top portion a hole for admitting the reflected infrared rays from the substrate to pass therethrough to said band-pass filters.

3. Apparatus as claimed in claim 2, which further comprises a second cavity arranged next to the cavity of the black-body radiator in a proceeding direction of the substrate, the second cavity having at its top portion a hole for admitting the infrared rays radiated due to the temperature of both of the paint coating and the substrate to pass therethrough to the band-pass filters.

4. Apparatus as claimed in claim 3, wherein the bandpass filters are concentrically arranged on a rotation disc so as to receive in turn the reflected infrared rays from the holes of said both cavities during the rotation of the disc.

5. Apparatus claimed in claim 4, which further comprises a correction data input circuit, which correction data relating to the treating condition of the substrate in a former step which influences the reflection coefficients of the reflection surface of the substrate, are memorized and supplied into the processing unit to correct the reflection coefficients supplied from said reference signal source.

6. Apparatus for measuring the thickness of a coating formed on a substrate comprising:
radiator means for continuously emitting infrared rays to the coating on the substrate;
at least one bandpass filter for passing infrared rays having a predetermined wavelength range, the infrared rays including infrared rays emitted from the radiator means and reflected at a surface of the substrate through the coating and infrared rays radiated due to the temperature of both the coating and the substrate;
a first infrared detector for measuring the intensity of the total reflected infrared rays passing through the filter and radiated due to the temperature of the coated substrate and producing an electrical signal;
a second infrared detector for measuring the intensity of the infrared rays passing through the filter and radiated due to the temperature of the coated substrate and producing an electrical signal;
a reference signal source in which various predetermined reference coefficients of infrared ray absorption with respect to various thicknesses of coatings and various predetermined reference reflection coefficients with respect to various kinds of reflection surfaces of different substrates are stored and signals representing these reference coefficients can be produced;
a processing circuit means for comparing the electrical signals of the first and second infrared detectors to eliminate the influence of the coating and substrate temperature and to modify the signal output in response to the reference coefficients supplied from the reference signal source, and
a correction data input circuit means in which correction data relating to any condition of the substrate which influences the reflection coefficients of the reflection surface of the substrate, are stored and supplied, if necessary, to the processing circuit means to correct the reflection coefficients supplied from the references signal source, whereby an output signal representative of the actual thickness of the coating is produced.

7. Apparatus claimed in claim 6, which further comprises a correction data input circuit means in which correction data relating to any condition of the substrate which influences the reflection coefficients of the reflection surface of the substrate, are stored and supplied to the processing circuit means to correct the reflection coefficients supplied from the reference signal source.

8. Apparatus as claimed in claim 6, wherein said radiator means has a hemispherical cavity having an inner surface from which the infrared rays are emitted and which has as its top portion a hole for admitting the reflected infrared rays from the substrate to pass therethrough to the bandpass filter.

9. Apparatus as claimed in claim 8, which further comprises a second cavity arranged next to the cavity of the radiator means, the second cavity having at its top portion a hole for admitting the infrared rays radiated due to the temperature of both the paint coating and the substrate to pass therethrough to the bandpass filter.

10. Apparatus as claimed in claim 6, wherein the bandpass filter is arranged on a rotation disc so as to receive in turn the reflected infrared rays from the holes of both cavities during the rotation of the disc.

11. Apparatus for measuring the thickness of a coating formed on a substrate comprising:
radiator means for continuously emitting infrared rays to the coating on the substrate including a black body radiator having a cavity adjacent the coated substrate with a hole to pass radiation;

at least one bandpass filter for passing infrared rays having a predetermined wavelength range, the infrared rays including infrared rays emitted from the radiator means and reflected at a surface of the substrate through the coating and infrared rays radiated due to the temperature of both the coating and the substrate;

a first infrared detector for measuring the intensity of the total reflected infrared rays passing through the filter and radiated due to the temperature of the coated substrate and producing an electrical signal;

an isolation chamber having the same shape and hole size as the black body cavity to pass infrared rays radiated by the temperature of the coated substrate;

a second infrared detector for measuring the intensity of the infrared rays passing through the filter and radiated due to the temperature of the coated substrate and producing an electrical signal;

a reference signal source in which various predetermined reference coefficients of infrared ray absorption with respect to various thicknesses of coatings and various predetermined reference reflection coefficients with respect to various kinds of reflection surfaces of different substrates are stored and signals representing these reference coefficients can be produced;

a correction data input circuit means in which correction data relating to any condition of the substrate which influences the reflection coefficients of the reflection surface of the substrate, are stored and signals representing this data can be produced, and a processing circuit means for comparing the electrical signals of the first and second infrared detectors to eliminate the influence of the coating and substrate temperature and to modify the signal output in response to the reference coefficients supplied from the reference signal source and the correction data supplied from the correction data input circuit means, whereby an output signal representative of the actual thickness of the coating is produced.

12. Apparatus as claimed in claim 11 wherein the bandpass filter is arranged on a rotation disc so as to receive in turn the reflected infrared rays from the holes of both cavities during the rotation of the disc.

* * * * *